(12) United States Patent
Chui et al.

(10) Patent No.: US 7,349,139 B2
(45) Date of Patent: Mar. 25, 2008

(54) SYSTEM AND METHOD OF ILLUMINATING INTERFEROMETRIC MODULATORS USING BACKLIGHTING

(75) Inventors: Clarence Chui, San Mateo, CA (US); Ming-Hau Tung, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/417,431

(22) Filed: May 3, 2006

(65) Prior Publication Data

US 2006/0209384 A1    Sep. 21, 2006

Related U.S. Application Data

(63) Continuation of application No. 11/057,392, filed on Feb. 11, 2005.

(60) Provisional application No. 60/613,536, filed on Sep. 27, 2004.

(51) Int. Cl.
*G02F 1/03* (2006.01)

(52) U.S. Cl. ..................... 359/242; 359/900

(58) Field of Classification Search ............... 359/223, 359/224, 290, 291, 292, 295, 298, 315, 318; 345/85; 348/770, 771, 772
See application file for complete search history.

(56) References Cited

U.S. PATENT DOCUMENTS

| 2,534,846 A | 12/1950 | Ambrose et al. |
|---|---|---|
| 3,439,973 A | 4/1969 | Paul et al. |
| 3,443,854 A | 5/1969 | Weiss |
| 3,448,334 A | 6/1969 | Frost |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,886,310 A | 5/1975 | Guldberg et al. |
| 3,955,880 A | 5/1976 | Lierke |
| 4,099,854 A | 7/1978 | Decker et al. |

(Continued)

FOREIGN PATENT DOCUMENTS

DE    3402746 A1    8/1985

(Continued)

OTHER PUBLICATIONS

XP 000657155, May 23, 1995, Tai.

(Continued)

*Primary Examiner*—Ricky Mack
*Assistant Examiner*—Tuyen Tra
(74) *Attorney, Agent, or Firm*—Knobbe, Martens, Olson & Bear, LLP

(57) ABSTRACT

An interferometric modulator array device with backlighting is disclosed. The interferometric modulator array device comprises a plurality of interferometric modulator elements, wherein each of the interferometric modulator elements comprises an optical cavity. The interferometric modulator array includes an optical aperture region, and at least one reflecting element is positioned so as to receive light passing through the optical aperture region and reflect at least a portion of the received light to the cavities of the interferometric modulator elements. In some embodiments, the interferometric modulator elements may be separated from each other such that an optical aperture region is formed between adjacent interferometric modulator elements.

16 Claims, 9 Drawing Sheets

U.S. PATENT DOCUMENTS

| | | |
|---|---|---|
| 4,196,396 A | 4/1980 | Smith |
| 4,228,437 A | 10/1980 | Shelton |
| 4,287,449 A | 9/1981 | Takeda et al. |
| 4,377,324 A | 3/1983 | Durand et al. |
| 4,389,096 A | 6/1983 | Hori et al. |
| 4,403,248 A | 9/1983 | te Velde |
| 4,421,381 A | 12/1983 | Ueda et al. |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,590,128 A | 5/1986 | Kawai |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | Te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,859,060 A | 8/1989 | Katagiri et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,164,858 A | 11/1992 | Aguilera, Jr. et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,426 A | 7/1994 | Tam et al. |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,322 A | 9/1994 | Fergason et al. |
| 5,345,328 A | 9/1994 | Fritz et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,398,125 A | 3/1995 | Willett et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,481,385 A | 1/1996 | Zimmerman et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |

| Patent Number | Date | Inventor |
|---|---|---|
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky et al. |
| 5,641,391 A | 6/1997 | Hunter et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,683,591 A | 11/1997 | Offenberg |
| 5,703,710 A | 12/1997 | Brinkman et al. |
| 5,710,656 A | 1/1998 | Goosen |
| 5,726,480 A | 3/1998 | Pister |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,771,321 A | 6/1998 | Stern |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,815,229 A | 9/1998 | Shapiro et al. |
| 5,818,095 A | 10/1998 | Sampsell |
| 5,825,528 A | 10/1998 | Goosen |
| 5,835,255 A | 11/1998 | Miles |
| 5,842,088 A | 11/1998 | Thompson |
| 5,912,758 A | 6/1999 | Knipe et al. |
| 5,914,804 A | 6/1999 | Goosen et al. |
| 5,920,417 A | 7/1999 | Johnson |
| 5,933,183 A | 8/1999 | Enomoto |
| 5,943,158 A | 8/1999 | Ford et al. |
| 5,959,763 A | 9/1999 | Bozler et al. |
| 5,986,796 A | 11/1999 | Miles et al. |
| 6,028,690 A | 2/2000 | Carter et al. |
| 6,031,653 A | 2/2000 | Wang et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,088,102 A | 7/2000 | Manhart |
| 6,099,132 A | 8/2000 | Kaeriyama |
| 6,100,872 A | 8/2000 | Aratani et al. |
| 6,113,239 A | 9/2000 | Sampsell et al. |
| 6,147,790 A | 11/2000 | Meier et al. |
| 6,160,833 A | 12/2000 | Floyd et al. |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,285,424 B1 | 9/2001 | Yoshida |
| 6,288,824 B1 | 9/2001 | Kastalsky |
| 6,295,154 B1 | 9/2001 | Laor et al. |
| 6,301,000 B1 | 10/2001 | Johnson |
| 6,323,982 B1 | 11/2001 | Hornbeck |
| 6,342,970 B1 | 1/2002 | Sperger et al. |
| 6,356,378 B1 | 3/2002 | Huibers |
| 6,377,233 B2 | 4/2002 | Colgan et al. |
| 6,379,017 B2 | 4/2002 | Nakabayashi et al. |
| 6,381,022 B1 | 4/2002 | Zavracky et al. |
| 6,447,126 B1 | 9/2002 | Hornbeck |
| 6,448,709 B1 | 9/2002 | Chuang et al. |
| 6,465,355 B1 | 10/2002 | Horsley |
| 6,466,354 B1 | 10/2002 | Gudeman |
| 6,466,358 B2 | 10/2002 | Tew |
| 6,473,274 B1 | 10/2002 | Maimone et al. |
| 6,480,177 B2 | 11/2002 | Doherty et al. |
| 6,492,065 B2 | 12/2002 | Nakagaki et al. |
| 6,493,475 B1 | 12/2002 | Lin |
| 6,496,122 B2 | 12/2002 | Sampsell |
| 6,519,073 B1 | 2/2003 | Goossen |
| 6,538,813 B1 | 3/2003 | Magno et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,570,584 B1 | 5/2003 | Cok et al. |
| 6,574,033 B1 | 6/2003 | Chui et al. |
| 6,589,625 B1 | 7/2003 | Kothari et al. |
| 6,597,419 B1 | 7/2003 | Okada et al. |
| 6,597,490 B2 | 7/2003 | Tayebati |
| 6,600,201 B2 | 7/2003 | Hartwell et al. |
| 6,606,175 B1 | 8/2003 | Sampsell et al. |
| 6,625,047 B2 | 9/2003 | Coleman, Jr., deceased |
| 6,630,786 B2 | 10/2003 | Cummings et al. |
| 6,632,698 B2 | 10/2003 | Ives |
| 6,636,653 B2 | 10/2003 | Miracky et al. |
| 6,642,913 B1 | 11/2003 | Kimura et al. |
| 6,643,069 B2 | 11/2003 | Dewald |
| 6,650,455 B2 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B2 | 1/2004 | Miles |
| 6,683,693 B1 | 1/2004 | Otsuka et al. |
| 6,700,695 B2 | 3/2004 | Engler |
| 6,710,908 B2 | 3/2004 | Miles et al. |
| 6,717,650 B2 | 4/2004 | Jain |
| 6,738,194 B1 | 5/2004 | Ramirez et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,768,522 B2 | 7/2004 | Yasukawa et al. |
| 6,768,555 B2 | 7/2004 | Chen et al. |
| 6,775,174 B2 | 8/2004 | Huffman et al. |
| 6,778,155 B2 | 8/2004 | Doherty et al. |
| 6,794,119 B2 | 9/2004 | Miles |
| 6,798,469 B2 | 9/2004 | Kimura |
| 6,811,267 B1 | 11/2004 | Allen et al. |
| 6,819,380 B2 | 11/2004 | Wen et al. |
| 6,819,469 B1 | 11/2004 | Koba |
| 6,822,628 B2 | 11/2004 | Dunphy et al. |
| 6,822,780 B1 | 11/2004 | Long, Jr. |
| 6,825,969 B2 | 11/2004 | Chen et al. |
| 6,829,132 B2 | 12/2004 | Martin et al. |
| 6,829,258 B1 | 12/2004 | Carlisle et al. |
| 6,844,953 B2 | 1/2005 | Reboa |
| 6,853,129 B1 | 2/2005 | Cummings et al. |
| 6,853,476 B2 | 2/2005 | Martin et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,871,982 B2 | 3/2005 | Holman et al. |
| 6,880,959 B2 | 4/2005 | Houston |
| 6,882,458 B2 | 4/2005 | Lin et al. |
| 6,882,461 B1 | 4/2005 | Tsai et al. |
| 6,903,487 B2 | 6/2005 | Shreeve et al. |
| 6,912,022 B2 | 6/2005 | Lin et al. |
| 6,917,459 B2 | 7/2005 | Nikkel et al. |
| 6,930,816 B2 | 8/2005 | Mochizuki |

| | | |
|---|---|---|
| 6,940,653 B2 | 9/2005 | Favalora et al. |
| 6,952,303 B2 | 10/2005 | Lin et al. |
| 6,954,297 B2 | 10/2005 | Reboa et al. |
| 6,958,847 B2 | 10/2005 | Lin |
| 6,972,882 B2 | 12/2005 | Ring et al. |
| 6,982,820 B2 | 1/2006 | Tsai |
| 6,995,890 B2 | 2/2006 | Lin |
| 6,999,225 B2 | 2/2006 | Lin et al. |
| 6,999,236 B2 | 2/2006 | Lin et al. |
| 7,002,726 B2 | 2/2006 | Patel |
| 7,006,272 B2 | 2/2006 | Tsai |
| 7,009,754 B2 | 3/2006 | Huibers |
| 7,016,095 B2 | 3/2006 | Lin |
| 7,019,876 B2 | 3/2006 | Yang |
| 7,038,752 B2 | 5/2006 | Lin |
| 7,042,643 B2 | 5/2006 | Miles |
| 7,064,875 B2 | 6/2006 | Kawano et al. |
| 7,072,093 B2 | 7/2006 | Piehl et al. |
| 7,072,096 B2 | 7/2006 | Holman et al. |
| 7,110,158 B2 | 9/2006 | Miles |
| 7,123,216 B1 | 10/2006 | Miles |
| 7,187,489 B2 * | 3/2007 | Miles ..................... 359/290 |
| 2001/0003487 A1 | 6/2001 | Miles |
| 2001/0019479 A1 | 9/2001 | Koki et al. |
| 2001/0055208 A1 | 12/2001 | Koichi |
| 2002/0024711 A1 | 2/2002 | MIles |
| 2002/0054424 A1 | 5/2002 | Miles |
| 2002/0075555 A1 | 6/2002 | Miles |
| 2002/0106182 A1 | 8/2002 | Kawashima |
| 2002/0126364 A1 | 9/2002 | Miles |
| 2002/0167730 A1 | 11/2002 | Needham et al. |
| 2002/0191130 A1 | 12/2002 | Liang et al. |
| 2003/0011864 A1 | 1/2003 | Flanders |
| 2003/0043157 A1 | 3/2003 | Miles |
| 2003/0072070 A1 | 4/2003 | Miles |
| 2003/0095401 A1 | 5/2003 | Kanson |
| 2003/0160913 A1 | 8/2003 | Yamashita |
| 2003/0160919 A1 | 8/2003 | Suzuki et al. |
| 2003/0169385 A1 | 9/2003 | Okuwaki |
| 2003/0193630 A1 | 10/2003 | Chiou |
| 2003/0202264 A1 | 10/2003 | Weber et al. |
| 2003/0210222 A1 | 11/2003 | Ogiwara et al. |
| 2003/0214621 A1 | 11/2003 | Kim et al. |
| 2004/0027315 A1 | 2/2004 | Senda et al. |
| 2004/0051929 A1 | 3/2004 | Sampsell et al. |
| 2004/0058532 A1 | 3/2004 | Miles et al. |
| 2004/0066477 A1 | 4/2004 | Morimoto et al. |
| 2004/0070711 A1 | 4/2004 | Wen et al. |
| 2004/0080938 A1 | 4/2004 | Holman et al. |
| 2004/0115339 A1 | 6/2004 | Nobuyuki |
| 2004/0125048 A1 | 7/2004 | Fukuda |
| 2004/0125281 A1 | 7/2004 | Lin et al. |
| 2004/0145049 A1 | 7/2004 | McKinnell et al. |
| 2004/0147056 A1 | 7/2004 | McKinnell et al. |
| 2004/0147198 A1 | 7/2004 | Lin et al. |
| 2004/0175577 A1 | 9/2004 | Lin et al. |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218390 A1 | 11/2004 | Holman et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0035699 A1 | 2/2005 | Tsai |
| 2005/0036095 A1 | 2/2005 | Yeh et al. |
| 2005/0038950 A1 | 2/2005 | Adelmann |
| 2005/0041175 A1 | 2/2005 | Akiyama |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutowski et al. |
| 2005/0069209 A1 | 3/2005 | Damera-Venkata et al. |
| 2005/0078348 A1 | 4/2005 | Lin |
| 2005/0179977 A1 * | 8/2005 | Chui et al. ................. 359/237 |
| 2005/0195462 A1 | 9/2005 | Lin |
| 2005/0195468 A1 | 9/2005 | Sampsell |
| 2005/0231977 A1 | 10/2005 | Hayakawa |
| 2006/0066783 A1 | 3/2006 | Sampsell |
| 2006/0066935 A1 | 3/2006 | Cummings et al. |
| 2006/0077154 A1 | 4/2006 | Gally et al. |
| 2006/0077509 A1 | 4/2006 | Tung et al. |
| 2006/0077510 A1 | 4/2006 | Chui et al. |
| 2006/0132383 A1 | 6/2006 | Gally et al. |
| 2006/0198013 A1 | 9/2006 | Sampsell |

FOREIGN PATENT DOCUMENTS

| | | |
|---|---|---|
| DE | 196 22 748 A1 | 12/1997 |
| DE | 10228946 A1 | 1/2004 |
| EP | 0366117 A2 | 5/1990 |
| EP | 0389031 A1 | 9/1990 |
| EP | 0 590 511 A | 4/1994 |
| EP | 0667548 A1 | 8/1995 |
| EP | 0786911 A2 | 7/1997 |
| EP | 0822441 A2 | 2/1998 |
| EP | 0855745 A | 7/1998 |
| EP | 1014161 A | 6/2000 |
| EP | 1089115 A1 | 4/2001 |
| EP | 1251454 A2 | 4/2002 |
| EP | 1251454 A3 | 4/2002 |
| EP | 1271223 A2 | 6/2002 |
| EP | 1341025 A1 | 9/2003 |
| EP | 1389775 A2 | 2/2004 |
| EP | 1413543 A1 | 4/2004 |
| EP | 1450418 A2 | 8/2004 |
| EP | 1519218 A1 | 3/2005 |
| FR | 2760559 A1 | 9/1998 |
| GB | 2278222 A | 11/1994 |
| GB | 2321532 A | 7/1998 |
| JP | 62-009317 | 1/1987 |
| JP | 04-081816 | 3/1992 |
| JP | 05-281479 | 10/1993 |
| JP | 405275401 A | 10/1993 |
| JP | 08018990 A | 1/1996 |
| JP | 9189869 | 7/1997 |
| JP | 09281917 A | 10/1997 |
| JP | 11174234 A | 7/1999 |
| JP | 11-211999 | 8/1999 |
| JP | 2000 075293 | 9/2000 |
| JP | 2000 193933 | 11/2000 |
| JP | 2001305312 | 10/2001 |
| JP | 2001/343514 A | 12/2001 |
| JP | 2002-174780 | 6/2002 |
| JP | 2002-287047 | 10/2002 |
| JP | 2002 245835 | 12/2002 |
| JP | 2003-131215 | 5/2003 |
| JP | 2003188959 | 7/2003 |
| KR | 2002/010322 A | 2/2002 |
| WO | WO 95/01584 | 1/1995 |
| WO | WO 95/14256 A1 | 5/1995 |
| WO | WO 95/30924 | 11/1995 |
| WO | WO 96/08833 | 3/1996 |
| WO | WO 97/17628 | 5/1997 |
| WO | WO 98/19201 | 5/1998 |
| WO | WO 99/52006 A2 | 10/1999 |
| WO | WO 99/52006 A3 | 10/1999 |
| WO | WO 99/63394 | 12/1999 |
| WO | WO 01/84229 | 11/2001 |

| | | |
|---|---|---|
| WO | WO 02/24570 A1 | 3/2002 |
| WO | WO 02/71132 A2 | 9/2002 |
| WO | WO 03/007049 A1 | 1/2003 |
| WO | WO 2003/056876 A2 | 7/2003 |
| WO | WO 03/069413 A1 | 8/2003 |
| WO | WO 03/073151 A1 | 9/2003 |
| WO | WO 03/075207 | 9/2003 |
| WO | WO 03/105198 A1 | 12/2003 |
| WO | WO 2004/003643 | 1/2004 |
| WO | WO 2004/006003 A1 | 1/2004 |
| WO | WO 2004/026757 A2 | 4/2004 |
| WO | WO 2004/027514 A2 | 4/2004 |
| WO | WO 2004/036270 A1 | 4/2004 |
| WO | WO 2004/068460 A1 | 8/2004 |

OTHER PUBLICATIONS

Akasaka,"Three-Dimensional IC Trends," Proceedings of IEEE, vol. 74, No. 12, pp. 1703-1714 (Dec. 1986).

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani et al., "Surface micromachined tuneable interferometer array," Sensors and Actuators, pp. 17-23 (1994).

Conner, "Hybrid Color Display Using Optical Interference Filter Array," SID Digest, pp. 577-580 (1993).

Fan et al., "Channel Drop Filters in Photonic Crystals", Optics Express, vol. 3, No. 1, 1998.

Giles et al., "Silicon MEMS Optical Switch Attenuator and Its Use in Lightwave Subsystems", IEEE Journal of Selected Topics in Quanum Electronics, vol. 5, No. 1, Jan./Feb. 1999, pp. 18-25.

Goossen, "MEMS-Based Variable Optical Interference Devices", 2000 IEEE/LEOS International Conference on Optical MEMS, pp. 17 and 18, (Aug. 21-24, 2000).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics, pp. 78-80 (Feb. 5, 1987).

Howard et al., "Nanometer-Scale Fabrication Techniques," VLSI Electronics: Microstructure Science, vol. 5, pp. 145-153, and pp. 166-173 (1982).

Hohlfeld et al., "Micro-Machined Tunable Optical Filters With Optimized Band-Pass Spectrum", 12th International Conference on Transducers, Solid-State Sensors, Actuators and Microsystems, vol. 2, pp. 1494-1497, (Jun. 8-12, 2003).

Huang, et al., "Multidirectional Asymmetrical Microlens-Array Light Control Films for High Performance Reflective Liquid Crystal Displays", SID Digest, 2002, pp. 870-873.

Ibbotson, et al. "Comparison of $XeF_2$ and F-atom Reactions with Si and $SiO_2$," Applied Physics Letters, vol. 44, No. 12, Jun. 1984. pp. 1129-1131.

Jackson, "Classical Electrodynamics," John Wiley & Sons Inc., pp. 568-573 (date unknown).

Jerman et al., "A Miniature Fabry-Perot Interferometer with a Corrugated Silicon Diaphragm Support", (1988).

Joannopulos et al., Photonic Crystals, "Molding the Flow of Light", Copyright 1995.

Johnson, "Optical Scanners," Microwave Scanning Antennas, vol. 1, pp. 251-261 (1964).

Kim et al., "Control of Optical Transmission Through metals Perforated With Subwavelength Hole Arrays", Optic Letters, vol. 24, No. 4, Feb. 15, 1999, pp. 256-257.

"Light over Matter," Circle No. 36 (Jun. 1993).

Lin et al., "Free-Space Micromachined Optical Switches for Optical Networking", IEEE Journal of Selected Topics in Quantum Electronics, vol. 5, No. 1, Jan./Feb. 1999, pp. 4-9.

Little et al., "Vertically Coupled Glass Microring Resonator Channel Dropping Filters", IEEE Photonics Technology Letters, vol. 11, No. 2, 1999.

Magel, "Integrated Optic Devices Using Micromachined Metal Membranes", SPIE vol. 2686, 0-8194-2060-Mar. 1996.

Manzardo et al., "Optics and Actuators for Miniaturized Spectrometers," International Conference on Optical MEMS, 12(6): 23-24 (Dec. 2003).

Mehregany et al., "MEMS Applications in Optical Systems", IEEE/LEOS 1996 Summer Topical Meetings, pp. 75-76, (Aug. 5-9, 1996).

Miles, "A New Reflective FPD Technology Using Interferometric Modulation," The Proceedings of the Society for Information Display (May 11-16, 1997).

Miles, et al., Digital Paper for reflective displays, Journal of the Society of Information Display, San Jose, CA, vol. 11, No. 1, 2003, pp. 209-215.

Miles, Interferometric Modulation: MOEMS as an enabling technology for high-performance reflective displays, Proceedings of the SPIE, 4985:28, pp. 131-139, Jan. 2003.

Miles, MW "A MEMS Based Interferometric Modulator (IMOD) for Display Applications" Proceedings of Sensors Expo, Oct. 21, 1997 © 1997 Helmer's Publishing, Inc. (Oct. 21, 1997), pp. 281-284 XP009058455.

Nagami et al., "Plastic Cell Architecture: Towards Reconfigurable Computing For General-Purpose", IEEE, 0-8186-8900-May 1998, pp. 68-77.

Newsbreaks, "Quantum-trench devices might operate at terahertz frequencies," Laser Focus World (May 1993).

Obi et al., "Fabrication of Optical MEMS in SOL-GEL Materials", 2002 IEEE/LEOS International Conference on Optical MEMS, Conference Digest, pp. 39 and 40, (Aug. 20-23, 2002).

Oliner, "Radiating Elements and Mutual Coupling," Microwave Scanning Antennas, vol. 2, 131-157 and pp. 190-194 (1966).

Raley et al., "A Fabry-Perot Microinterferometer for Visible Wavelengths," IEEE Solid-State Sensor and Actuator Workshop, Hilton Head, SC, pp. 170-173 (1992).

Schnakenberg, et al. "TMAHW Etchants for Silicon Micromachining", 1991 International Conference on Solid State Sensors and Actuators—Digest of Technical Papers. pp. 815-818.

Sperger et al., "High Performance Patterned All-Dielectric Interference Colour Filter for Display Applications," SID Digest, pp. 81-83 (1994).

Stone, "Radiation and Optics, An Introduction to the Classical Theory", McGraw-Hill, pp. 340-343, (1963).

Tai, C.Y. et al., "A Transparent Front Lighting System for Reflective-type Displays," 1995 SID International Symposium Digest of Technical Papers, Orlando, May 23 -25, 1995, SID International Symposium Digest of Technical Papers, Santa Ana, SID, US vol. 26, May 23, 1995. pp. 375-378, XP000657155.

"Science and Technology", The Economist, May 22, 1999, pp. 89-90.

Walker et al., "Electron-beam-tunable Interference Filter Spatial Light Modulator," Optics Letters vol. 13, No. 5. pp. 345-347 (May 1988).

Williams, et al. "Etch Rates for Micromachining Processing", Journal of Microelectromechanical Systems. vol. 5, No. 4, Dec. 1996, pp. 256-269.

Winters, et al., "The Etching of Silicon with $XeF_2$ Vapor", Applied Physics Letters, vol. 34. No. 1, Jan. 1979, pp. 70-73.

Winton, "A novel way to capture solar energy," Chemical Week, pp. 17-18 (May 15, 1985).

Wu et al., "Design of a Reflective Color LCD Using Optical Interference Reflectors," ASIA Display '95, pp. 929-931 (Oct. 16, 1995).

Zhou et al., "Waveguide Panel Display Using Electromechanical Spatial Modulators" SID Digest, vol. XXIX, 1998.

Notice of Allowance for U.S. Appl. No. 11/057,392, dated Apr. 6, 2006.

Notice of Allowance for U.S. Appl. No. 11/057,392, dated Aug. 10, 2006.

Notice of Allowance for U.S. Appl. No. 11/057,392, dated Jun. 6, 2007.

Office Action for U.S. Appl. No. 10/794,825, dated Jun. 17, 2004.

Office Action of U.S. Appl. No. 10/794,825, dated Mar. 11, 2005.

Office Action of U.S. Appl. No. 10/794,825, dated Jul. 5, 2006.

Final Office Action of U.S. Appl. No. 10/794,825, dated Feb. 15, 2007.

Office Action of U.S. Patent Application No. 10/794,825, dated Aug. 1, 2007.

Notice of Allowance of U.S. Appl. No. 10/794,825, dated Jan. 13, 2006.

Office Action for U.S. Appl. No. 11/417,808, dated Jun. 14, 2006.

Final Office Action for U.S. Appl. No. 11/417,808 dated Nov. 27, 2006.

Office Action for U.S. Appl. No. 11/417,808, dated Jun. 29, 2007.

* cited by examiner

SYSTEM AND METHOD OF ILLUMINATING INTERFEROMETRIC MODULATORS USING BACKLIGHTING

CROSS REFERENCE TO RELATED APPLICATIONS

The present application is a continuation of U.S. patent application Ser. No. 11/057,392, filed Feb. 11, 2005, entitled "SYSTEM AND METHOD OF ILLUMINATING INTERFEROMETRIC MODULATORS USING BACKLIGHTING," which claims priority benefit under 35 U.S.C. § 119(e) from U.S. Provisional Patent Application No. 60/613,536, filed Sep. 27, 2004, entitled "SYSTEM AND METHOD OF ILLUMINATING INTERFEROMETRIC MODULATORS USING BACKLIGHTING." The present application incorporates the foregoing disclosures herein by reference in their entirety.

BACKGROUND

1. Field of the Invention

The invention relates generally to a system and method of illuminating a display, and more particularly to a system and method of illuminating a display using backlighting and one or more reflecting elements.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

For certain applications, interferometric modulator devices can be arranged in an array configuration to provide a display assembly having advantageous operational and performance characteristics. For example, these displays may have rich color characteristics as well as low power consumption.

Interferometric modulator devices in such displays operate by reflecting light and producing optical interference. Interferometric modulator arrays can operate by modulating ambient light reflected from the array. When ambient light is unavailable or insufficient, however, auxiliary lighting, such as provided by backlighting, is desirable. Thus, systems and methods for illuminating an interferometric modulator array are needed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment of a spatial light modulator comprises a light-modulating array comprising a plurality of light-modulating elements each having a cavity defined by first and second optical surfaces wherein the second optical surface is movable with respect to the first optical surface. The light-modulating array includes at least one optical aperture region. The light-modulating array device further comprises at least one reflecting element formed between a substrate and the plurality of light-modulating elements and configured to receive light passing through the optical aperture region and to reflect at least a portion of the received light to the cavity. Backlighting is thereby facilitated in certain embodiments.

The at least one reflecting element may comprise at least one of aluminum, silver, titanium, gold, and copper. In addition, the at least one reflecting element may have a sloped surface.

The reflecting element may have a substantially convex geometry, or a substantially concave geometry. Furthermore, the at least one reflecting element may comprise sections interconnected so as to form a continuous unitary structure extending proximal to a plurality of light-modulating elements.

The spatial light modulator may further comprise a mask aligned with the at least one reflecting element so as to at least partially obstruct a view of the at least one reflecting element. The mask may comprise at least a portion of an etalon, and the portion of the etalon may comprise one or more layers of partially reflective material and one or more spacing layers.

In some embodiments, the at least one reflecting element comprises at least a shaped feature and a reflecting material over the shaped feature.

The substrate of the light-modulating array may comprise at least one cavity, wherein the at least one reflecting element is formed in the cavity of the substrate. The at least one reflecting element may comprise a reflective material in substantially particulate form suspended in a substantially transparent material.

In some embodiments, the plurality of light-modulating elements include a metal layer, wherein the metal layer comprises a plurality of optically transmissive apertures. At least some of the light-modulating elements may be separated from each other so as to form an optical aperture region therebetween.

One embodiment of a method of manufacturing a spatial light modulator comprises forming at least one reflecting element on a substrate, and forming a plurality of light-modulating elements above the at least one reflecting element on the substrate so as to form a light-modulating array. Each of the light-modulating elements comprises first and second optical surfaces that define a cavity, wherein the second optical surface is movable with respect to the first optical surface. The light-modulating array has at least one optically transmissive aperture region. The at least one reflecting element is configured to receive light through the at least one aperture region and reflect at least a portion of the received light into the cavity.

Forming the at least one reflecting element may comprise depositing at least one of aluminum, silver, titanium, gold, and copper, and forming the at least one reflecting element may comprise depositing one or more materials to form a substantially sloped surface, a substantially convex geometry, or a substantially concave geometry. In some embodiments, forming the at least one reflecting element comprises forming a shaped base structure on the substrate, and depositing a reflecting material on the shaped base structure.

The method may further comprise forming a cavity in the substrate, and forming the at least one reflecting element substantially in the cavity of the substrate. Forming the at least one reflecting element may comprise depositing a layer of reflecting material on the substrate and surface treating the layer so as to increase the reflectivity and/or scattering of the reflecting material.

In some embodiments, the method further comprises forming a concealing feature on the substrate aligned with the at least one reflecting element so as to conceal the visible presence of the at least one reflecting element. The concealing feature may comprise a mask of at least one of an absorbing material, a reflective material, and a transmissive material. The concealing feature may comprise a mask layer of at least one of carbon black material, a dye, chromium, and molybdenum. In some embodiments, the concealing feature comprises a metal film so as to form an etalon comprising the metal film and the at least one reflecting element. The etalon may be configured to appear to a viewer as a predetermined color.

In one embodiment of the method, forming the at least one reflecting element comprises depositing a composite material on the substrate surface, wherein the composite material comprises reflective particles suspended in a substantially transparent material. The composite material may be deposited at discrete locations on the substrate surface so as to form a plurality of reflecting elements, or the composite material may be deposited on the substrate surface as a continuous layer, thereby forming a single reflecting element structure.

In some embodiments, the light-modulating element comprises an interferometric modulator element and the light-modulating array comprises an interferometric modulator array. In other embodiments, however, other types of light modulators including other types of MEMS structures may be employed.

One embodiment of a method of backlighting an interferometric modulator array comprises positioning a light source proximate a first side of the interferometric modulator array, and reflecting light from the light source to a second opposite side of the interferometric modulator array. In some embodiments, the light is reflected with one or more reflecting elements positioned between a substrate and a plurality of interferometric modulator elements formed on the substrate. In addition, the method may further comprise masking the one or more reflecting elements to hide the reflecting element from view, and masking may comprise forming at least a portion of an etalon between the one or more reflecting elements and a viewer.

In some embodiments of the method, the light is reflected with a plurality of discrete reflecting elements, and the light may be reflected with one or more reflecting elements having sloped surfaces. The light may be reflected with one or more convex reflecting elements, or one or more concave reflecting elements. The light may be reflected with one or more reflecting elements comprising at least one of aluminum, silver, titanium, gold, and copper.

DETAILED DESCRIPTION OF PREFERRED EMBODIMENTS

As discussed more fully below, in certain preferred embodiments, one or more reflecting elements may be integrated in a display to direct illumination from a back light to nearby interferometric modulator elements. An interferometric modulator array may include one or more aperture regions through which illumination from a source of back lighting propagates. The aperture regions may be located between adjacent interferometric modulator elements, for example. The one or more reflecting elements is formed between a substrate and the interferometric modulator array. The reflecting elements may be positioned so as to receive light passing through the aperture regions and reflect the received light into optical cavities of the interferometric modulators. The reflecting elements may have curved or sloped surfaces that direct light as desired. The reflecting elements may comprise reflective materials such as aluminum or silver. In certain embodiments, the reflecting elements may comprise a base material such as a photoresist and a reflective overlaying material such as aluminum or silver. These reflecting elements may be formed on or in the substrate and may be covered by planarization. The efficiency of backlighting may be enhanced with such reflecting elements. These reflecting elements may also prevent leakage of light through the front of the display.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
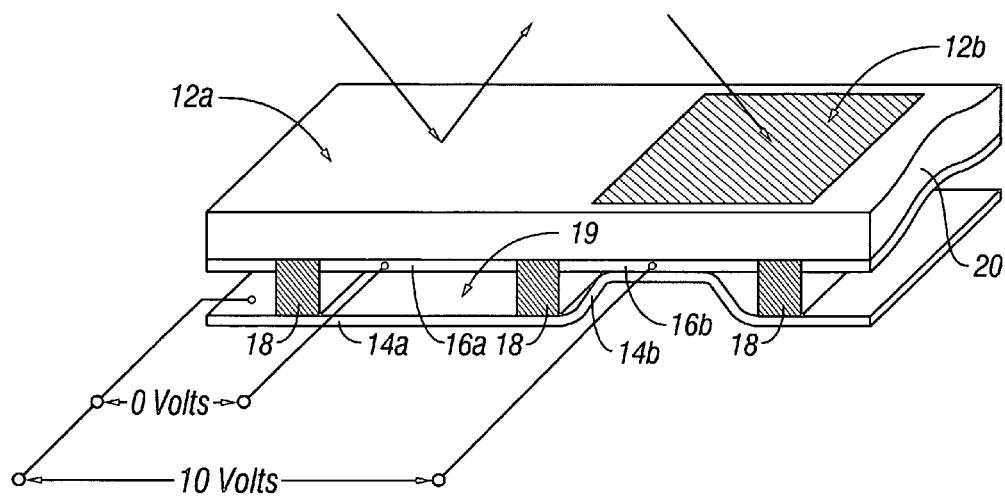
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
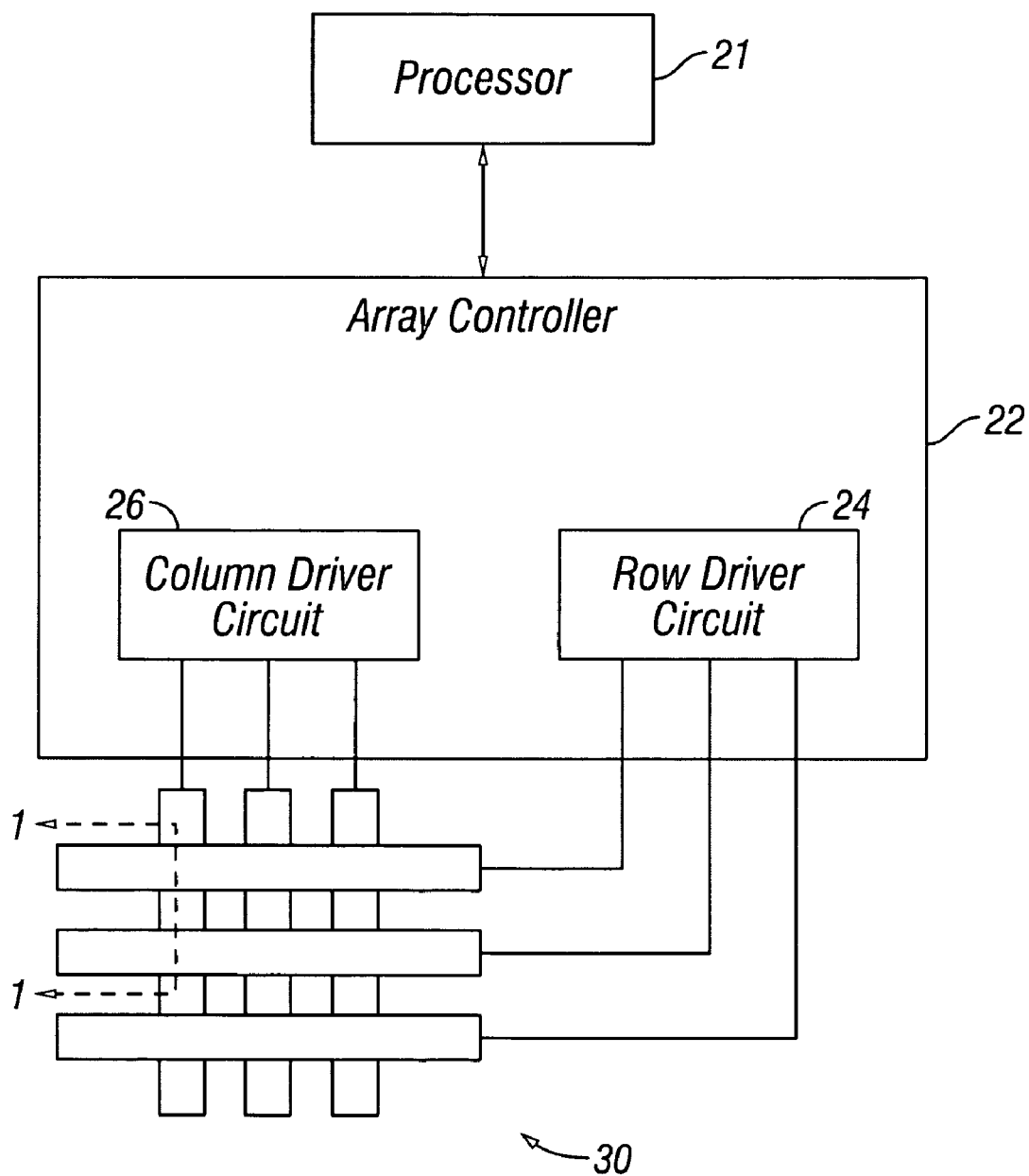
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts.

In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
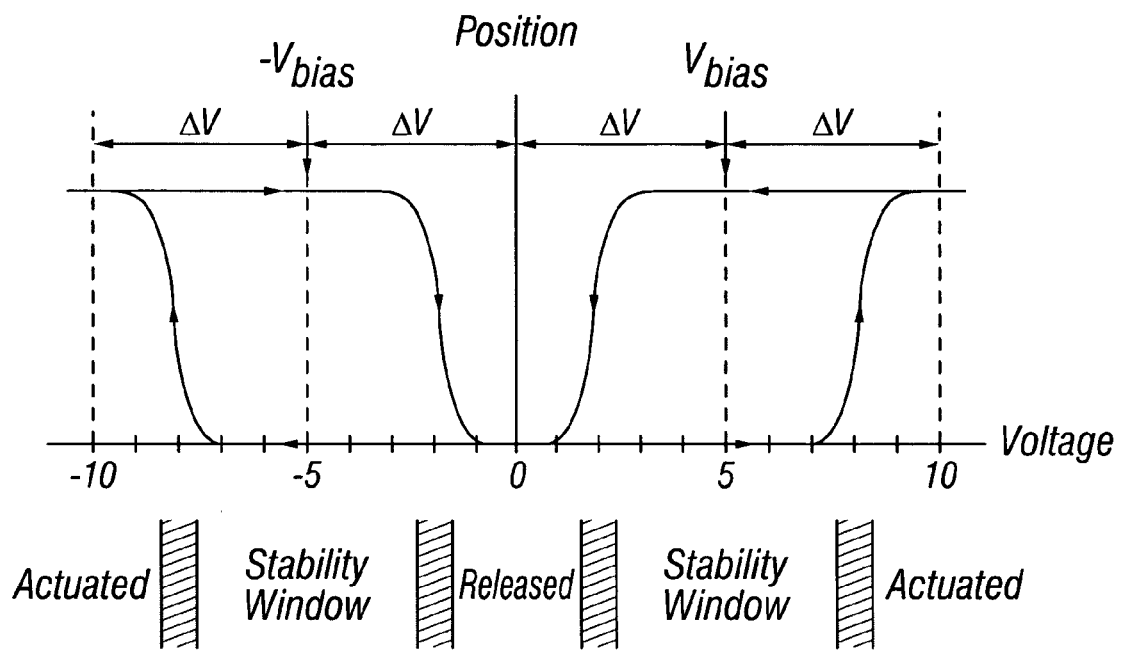
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
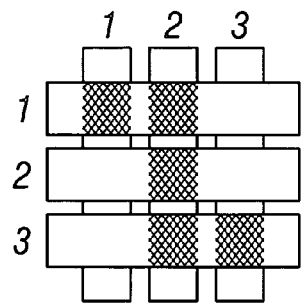
FIGS. 5A and 5B illustrate one exemplary timing diagram for row and column signals that may be used to write a frame of display data to the 3×3 interferometric modulator display of FIG. 2.
Figure 5B:
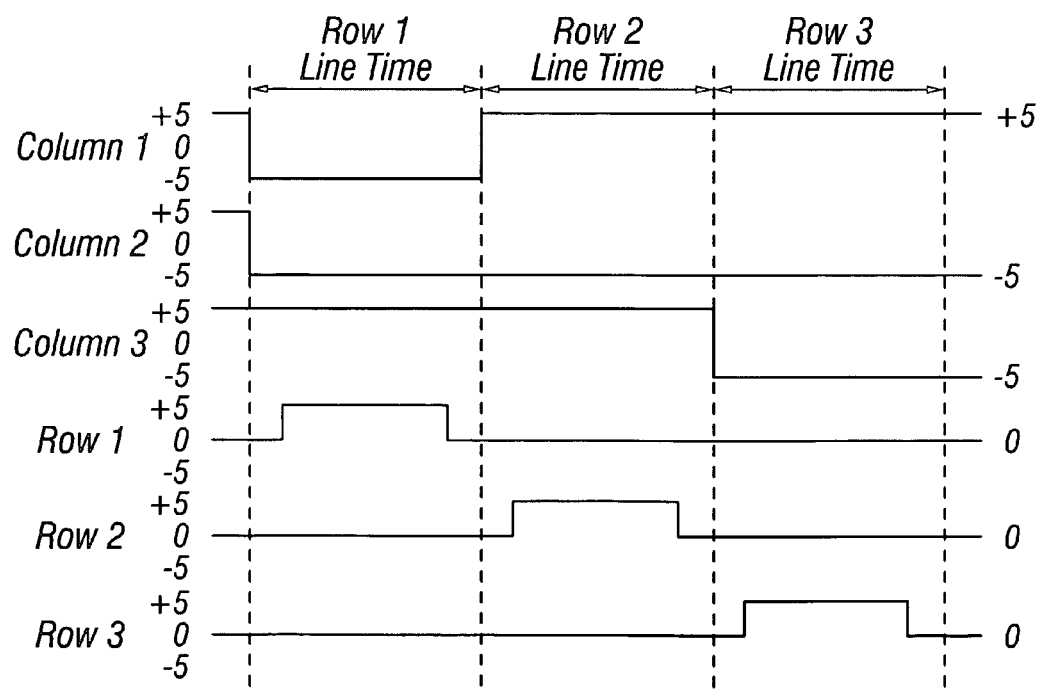

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
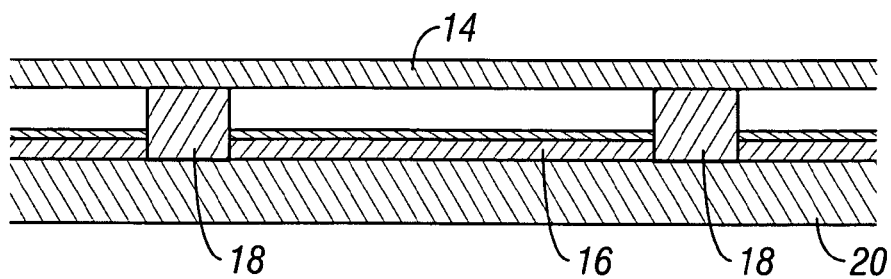
FIG. 6A is a cross section of the device of FIG. 1.
Figure 6B:
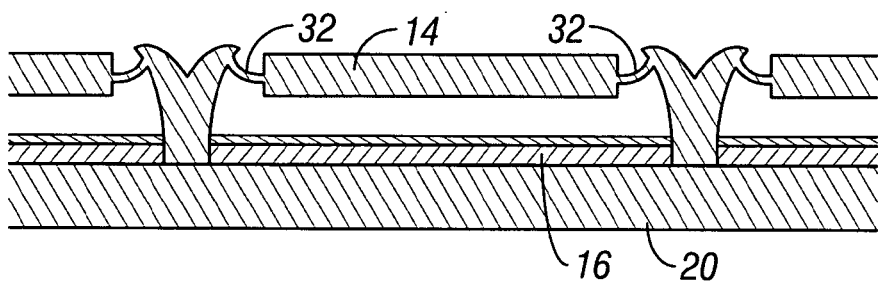
FIG. 6B is a cross section of an alternative embodiment of an interferometric modulator.
Figure 6C:
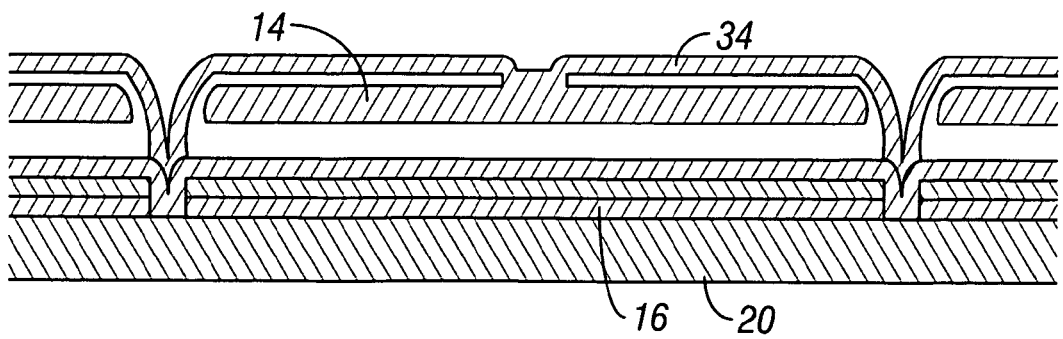
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

An "interferometric modulator" such as included, for example, in an array of interferometric modulators forming a spatial light modulator may also be referred to herein as an "interferometric modulator element."

Figure 7:
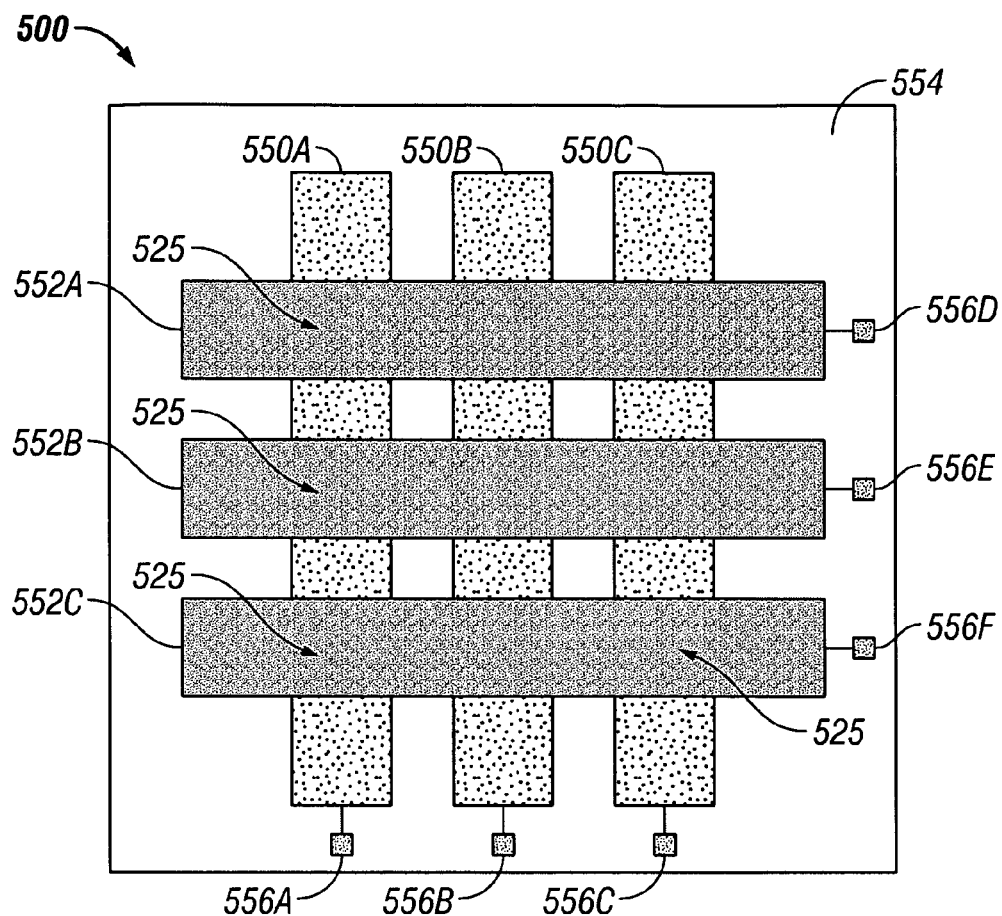
FIG. 7 is a plan view of an interferometric modulator array showing electrodes for driving the interferometric modulators.

FIG. 7 is a top view of an exemplary interferometric modulator array 500 on a substantially transparent substrate 554, such as glass. In a process such as described above, layers of material are patterned to form lower electrode columns 550A-C and upper electrode rows 552A-C as illustrated in FIG. 7. Although not visible in FIG. 7, optical cavities or etalons defined by upper and lower mirror surfaces (not shown) are created at the intersection of the row 552A-C and column electrodes 550A-C. In the illustrated embodiment, three electrode columns 550A-C and three electrode rows 552A-C forming nine interferometric modulators elements 525 are shown, although larger or smaller arrays 500 may contain more or less interferometric modulators. Alternative configurations are also possible. For example, the interferometric modulator element 525 need not be the same size and shape and need not be arranged in vertical columns and horizontal rows. Alternately, the space occupied by the interferometric modulator element 525 at a given intersection of a column electrode and a row electrode may instead comprise a plurality of interferometric modulator elements smaller in dimension than those illustrated.

Additionally, the array 500 could also be fabricated with distinct upper mechanical electrodes, for example, one for each interferometric modulator 525 instead of a single electrode 552 extending across a row of interferometric modulators. The discrete upper mechanical electrodes can be electrically contacted through a separate layer, for example. Additionally, portions of the electrodes (e.g., the upper mechanical electrodes 552) that connect individual modulators 525 in a row may have a reduced width. Such reduced width electrode portions may provide connections between the interferometric modulators 525 narrower than shown in FIG. 7. The narrow electrode portions connecting individual modulators may be located, for example, at the corners of the interferometric modulator 525 in some embodiments as discussed more fully below.

As shown in FIG. 7, each column 550A-C is electrically connected to a contact pad 556A-C. Each row 552A-C is also electrically connected to a contact pad 556D-F. Timing and data signals may be connected to the contact pads 556 to address the interferometric modulator array. As described above, however, the embodiment illustrated is exemplary in nature as other configurations and designs may be employed, such as interferometric modulator arrays without electrical contacts.

Figure 8A:
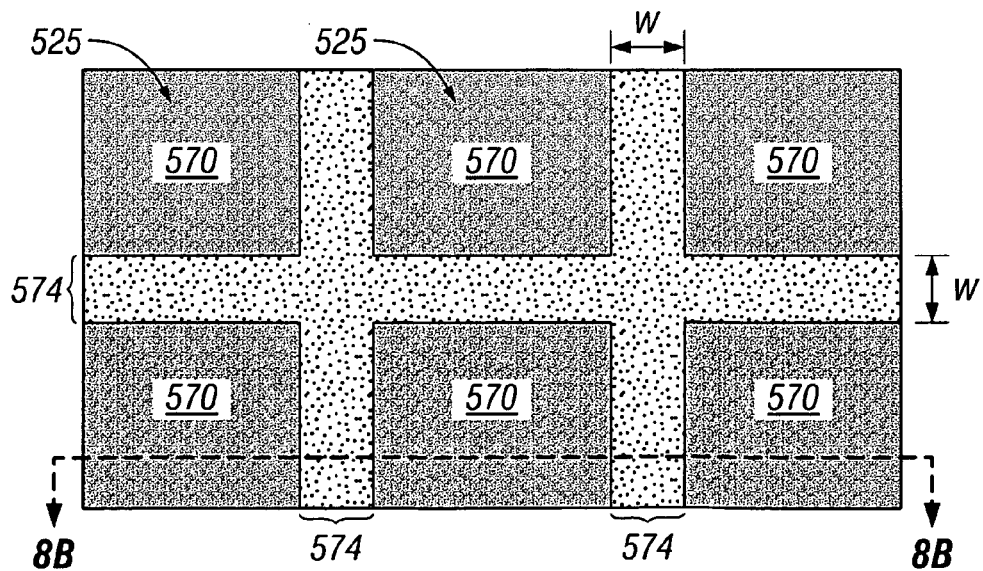
FIG. 8A is a plan view of one embodiment of an interferometric modulator array comprising a plurality of interferometric modulator elements separated by aperture regions.

In certain embodiments, backlighting is used to illuminate a display comprising at least one interferometric modulator array 500 such as shown in FIG. 8A. In such configurations, the interferometric modulator array 500 may be designed to receive illumination from the back, or a non-viewing side of the interferometric modulator array.

In the array 500 shown in FIG. 8A, separations 574 between interferometric modulator elements 525 form optical aperture regions, as seen from a non-viewing side of the array. The part of the interferometric modulators 525 that is depicted in FIG. 8A corresponds to the mechanical layer 570 that supports the upper mirrors (not shown) as described above in connection with FIGS. 1-6C. This array 500 is fabricated with distinct or separate portions 570 of the upper mechanical electrodes, for example, one for each interferometric modulator 525, instead of a single electrode strip extending across a row of interferometric modulators as shown in FIG. 7. These portions 570 of the mechanical layer are separated so as to form the optically transmissive aperture regions or spaces 574 therebetween. The discrete upper mechanical electrodes 570 can be electrically contacted through a separate layer, for example, as described above.

In the exemplary embodiment illustrated in FIG. 8A, the discrete portions of the upper mechanical electrodes 570 create a grid-like shaped spacing between the interferometric modulators 525. The optically transmissive apertures regions 574 in the upper electrode layer 570 may be substantially devoid of material and/or these optical aperture regions may comprise material which is substantially optically transmissive.

The spaces or aperture regions in the interferometric modulator array 500 are not limited to those formed between the pixels in a display and may include, for example, spaces between a plurality of interferometric modulator elements corresponding to sub-pixel elements within a pixel. These sub-pixels may be used to provide increased color or grayscale range in multi-color or gray-scale displays, respectively. In some embodiments, the interferometric modulator array comprises one or more optically transmissive aperture region in the mechanical layer and mirror of one or more interferometric modulator elements. As discussed above, the one or more optically transmissive aperture regions may be substantially devoid of material and/or these optical aperture regions may comprise material which is substantially optically transmissive.

In one embodiment, the interferometric modulator array may comprise one or more substantially central optically transmissive aperture regions. Certain embodiments of an interferometric modulator device can comprise optically transmissive aperture regions in a combination of the above-described locations and configurations, such as optically transmissive aperture regions both between adjacent interferometric modulator elements and in the mechanical layer and mirror of one or more interferometric modulator elements.

In one embodiment, the optically transmissive aperture regions 574 have a generally constant width w. The width w may be determined by the minimum features size or other design rules of the fabrication process. In general, the space 574 between adjacent portions of the mechanical layer 570 for different interferometric modulators 525 is as small as possible so as to avoid wasting any pixel area. The width w can, however, be different depending, e.g., on the size and design of the display device or other factors and is not limited by the embodiments described and illustrated herein. For example, the optical aperture region 574 between distinct portions of the mechanical layer 570 may be made larger than the minimum size in order to increase the amount of light that passes through the optical aperture region 574 and that is injected into the interferometric modulator elements 525. In various embodiments, the width of the aperture regions 574 ranges from between about 2 μm and 1582 m, although widths outside this range are possible. In addition, the length of the aperture regions 574 ranges from between about 10 μm and 100 μm, although lengths outside this range may be employed. The width and lengths of the aperture regions 574 need not be constant and may vary throughout the array, for example, to control light levels at different locations in the array 500. Accordingly, the size and shape of the interferometric modulator elements 525 and corresponding portions of the mechanical layer 570 need not be uniform and may vary. For example, in certain embodiments, the size of the interferometric modulator elements 525 for different sub-pixels within a pixel are dithered to provide increased color or grayscale levels.

Figure 8B:
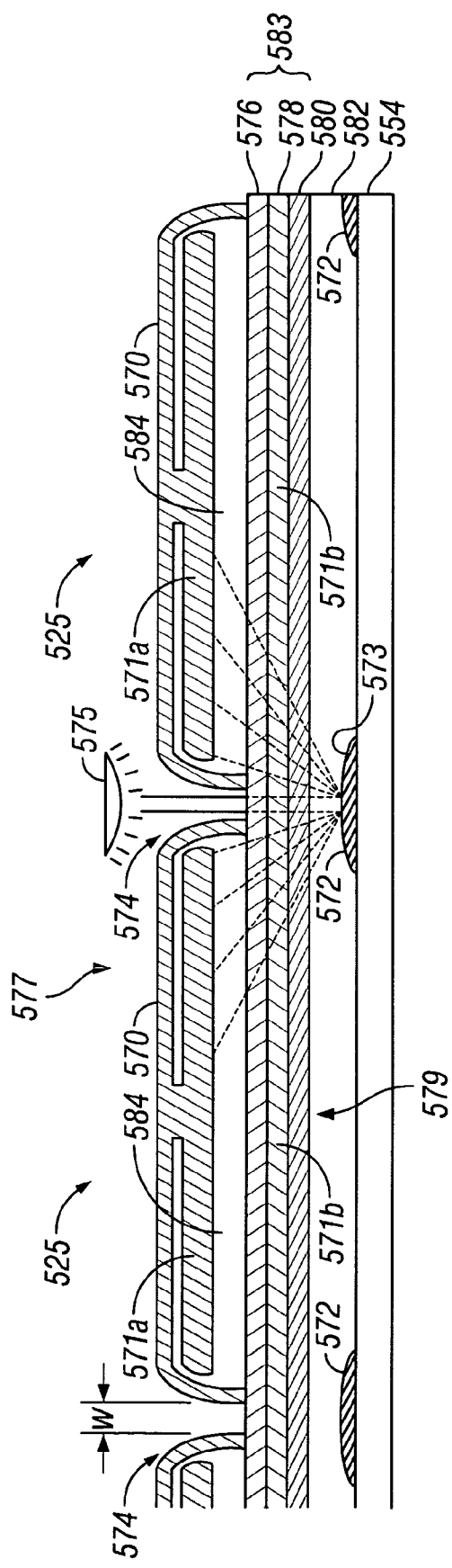
FIG. 8B is a cross-sectional view of the interferometric modulator array of FIG. 8A showing illumination by a backlighting element.

FIG. 8B is a cross-sectional view of the interferometric modulator array 500 of FIG. 8A, taken along line 8B-8B. FIG. 8B shows one embodiment wherein a backlight 575 is positioned proximate a first, non-viewing side 577 of the interferometric modulator array 500. This backlight source 575 is configured to spread light upon the different portions of the mechanical layer 570 and through optically transmissive aperture regions 574. In certain embodiments, this backlight source 575 is elongated in one or more dimensions. The backlight source 575 shown in FIG. 8B, however, is exemplary, as other types of backlighting sources may be used.

In some embodiments, the backlight source 575 may comprise, for example, discrete light sources such as light emitting diodes. The backlight source 575 may also comprise a combination of one or more light emitters and optics, such as a waveguide, configured to transfer or propagate light from the light emitter to the interferometric modulator array 500. An optically transmissive layer extending across the array 500 may, for example, be used as a waveguide.to couple light to the interferometric modulators 525. The emitters may be disposed at the edge of this waveguide to inject light in the waveguide.

As shown in FIG. 8B, in order to direct light from the backlight source 575 to optical cavities 584 in respective interferometric modulators 525, one or more light reflecting elements 572 are included in the display. The reflecting element 572 is configured to reflect light from the backlight source 575 passing through the optically transmissive aperture regions 574 between the interferometric modulator elements 525. The reflecting element has a reflecting surface 573 that directs the light to optical cavities 574 in the interferometric modulators 525. The light reflecting element 572 may also be referred to as a "scattering element", wherein the reflecting element 572 is further configured to scatter or deflect light into the optical cavities 574 to fill the cavities with light.

The reflecting element 572 may comprise, for example, a grid-like reflecting element that is aligned with the optically transmissive aperture regions 574 between columns and rows of interferometric optical elements 525. This unitary structure 572 may, for example, comprise columnar or elongated reflective sections aligned parallel to the rows and columns of modulators 525. FIG. 8B shows a cross-section of columnar or elongated reflecting sections that form part of such a grid-like reflecting element 572. FIG. 8B shows the reflecting surface 573 of the reflecting element 572 configured to direct light into the optical cavities of the interferometric modulators 525.

Alternatively, a plurality of reflecting elements 572 comprising, for example, a plurality of discrete structures such as dots, or separate elongate sections may be used. These discrete structures may comprise, e.g., bumps, mounds, and ridges having a reflective surface. The reflecting elements 572 may be positioned in a regular (uniform) or irregular (e.g., random) arrangement. The reflecting elements 572 may have more complex shapes or geometries as well. For example, a grid-like pattern may be segmented into shapes other than columns and rows (e.g., "+" or "L" shaped elements). Still other shapes are possible that may or may not together form a grid-like pattern. As described above, however, in some embodiments, a single reflecting element 572 may be used.

As shown in FIG. 8B, the reflecting element 572 is disposed on a substrate 554 between the substrate and the interferometric modulator elements 525. The reflecting element 572 may have sections located proximate the optically transmissive aperture regions 574 between different portions of the mechanical layer 570. Accordingly, the corresponding sections of the reflecting surface 573 are proximate the optically transmissive aperture regions 574. In one embodiment, the reflecting element 572 or sections thereof are aligned with the aperture regions 574, and may be visible through the aperture regions when viewed from the non-viewing side 577 as shown in FIG. 8A.

The reflecting element 572 is configured to receive light from the backlight source 575, positioned proximal to the non-viewing or first side of the interferometric modulator array 500 wherein the mechanical layer 570 is located (designated by arrow 577), through the optically transmissive aperture regions 574, and to reflect the received light to a second side 579 of the interferometric modulator array visible to a viewer. This second side 579 of the interferometric modulator array, which is visible to a viewer, is opposite the first side of the interferometric modulator array where the backlight source 575 is located. FIG. 8B additionally shows the optical cavity 584 in each interferometric modulator element 525 that is formed between an upper mirror 571a extending from the mechanical layer 570 and a lower mirror 571b comprising, e.g., a metal layer 578 formed over the substrate 554. As described above, the shape of the reflecting surface 573 on the reflecting element 572 is configured to reflect and/or scatter light into the optical cavity 584.

In the embodiment illustrated in FIG. 8B, the reflecting element 572 has a substantially convex cross-section with respect to the substrate 554. Accordingly, the cross-section of the reflecting element is sloped on opposite sides with portions of the reflecting surface 573 inclined toward the aperture region 574 and facing adjacent the optical cavities 584. The reflecting surface 573 shown is curved. However, the geometry of the reflecting elements 572 is not limited to that illustrated and described herein as other geometries are contemplated. For example, the reflecting elements may have flat or planar sections that may or may not be tilted or slanted with respect to the substrate 554. For example, the cross-section may be triangular-shaped. Other shapes are also possible. The cross-section may for example be substantially concave. As described above, sections of the reflecting element may be elongated. Alternatively, the sections need not be elongated such as in the case of mounds, bumps, or dots which may in some embodiments be generally circularly symmetrical. Alternately, the reflecting elements may have a non-uniform geometry. Also, although the reflective surface 573 is shown as substantially smooth, the reflective surface may be rough. The reflective surface may be stepped or jagged. As described above, reflection from the reflective surface 573 may be diffuse or specular.

The reflecting elements may also be surface treated to increase reflectivity and scattering attributes. For example, the reflective surface 573 can be micro-etched so as to create, for example, more surface area, roughness, and/or ridges so as to increase the deflection/scattering of light. Alternately, the reflective surface 573 can be micro-etched so as to smooth the reflective surface 573, thereby increasing the light concentration and possibly improving the uniformity of the backlighting of the interferometric modulator array.

In one embodiment, one or more reflecting elements comprise a material with a substantially flat or planar structure and micro-roughness, wherein the reflecting element material may be deposited and formed in one or more layers by a process that includes etching, thermal annealing, and/or radiated curing, for example. The micro-roughness may be created by micro-etching, control of a deposition process, and/or attributes of the material.

In other embodiments, one or more reflecting elements 572 comprise a substantially optically transmissive material and a plurality of reflective particles suspended in the transmissive material. The reflective particles preferably comprise a material configured to reflect and/or scatter incident light. As discussed above, the one or more reflecting elements may have a unitary structure such as a continuous layer and/or the reflecting elements may comprise a plurality of discrete structures. The reflective layer may comprise a substantially grid-like pattern in certain embodiments.

The position and structure (e.g., shape) of the reflecting elements 572 can be manipulated so as to optimize their effectiveness in directing light into the interferometric modulator cavities 584. The reflecting light element 572 may be positioned directly beneath the optical aperture regions 574 in some embodiments, although the reflecting element may be located differently as well.

In one embodiment, the reflecting elements 572 are wide enough and shaped so that substantially all light from the backlight 575 passing through the aperture regions 574 are reflected into the cavities 584 of the interferometric modulator array elements 525. In some embodiments, the width of the reflecting element 572 may vary based upon the size of the angular distribution of light from the backlight 575 passing through the aperture regions 574. For an uncollimated backlight source (i.e., coming through the holes through a wide range of angles), the size of the reflecting element 572 may be a function of the distance from the aperture region to the reflecting element 572. This distance may be determined, for example, by the thickness of the upper mirror 571, the spacing between the mirror 571 and the reflecting element 572. The width (w) of the aperture regions 574 may also be a factor as well as the range of angle of the entering light through the aperture region. When light comes through the apertures 574 at a limited range of angles, the reflecting element may be smaller.

In one embodiment, the reflecting elements 572 have a width of substantially greater than the width w of the aperture regions 574, and preferably greater than 3w. In one embodiment, the reflecting element 572 extends a distance of at least w beyond. either side of the corresponding aperture region 574.

Extremely wide reflecting elements 572, while effective in blocking stray light, may reduce the amount of pixel area available for the reflective state. Thus, a trade-off exists between selecting wide reflecting elements to deflect more light and the pixel area available for the reflective state of the interferometric modulator element 525. Reflecting elements 572 may have a width of about 1 μm to about 10 μm. Reflecting elements 572 may have cross-sections with larger or smaller widths in other embodiments.

The reflecting element 572 may have a height of between about 200Å and about 1000Å, although values outside this range are possible. The height may also vary with different sections of the reflecting element 572 located at different positions about an interferometric modulator 525 or at different locations in the array 500 having different heights.

The reflecting element 572 preferably comprises one or more reflective materials and may include at least one of aluminum, silver, titanium, gold, and copper, for example. Other materials may be employed. Furthermore, the reflecting elements 572 can be either specular or diffuse reflecting optical elements.

As discussed above, the reflecting element 572 is formed on the substrate 554 between the substrate and the interferometric modulator elements 525. The substrate 554 may have a thickness of about 200 μm to about 2 mm, or about 2 mm to about 5 mm, for example, or may be larger or smaller. The reflecting elements 572 are covered by a layer of substantially optically transmissive material such as a planarization material 582. This layer may have a thickness of about 1 μm, for example. The spacing between the mirror 571 and the reflecting element 572, which is discussed above, is related to the thickness of the planarization material 582. Other materials may be employed in alternative embodiments.

One or more interferometric modulator elements 525, each comprising optical cavities 584, are formed above the planarization material 582. These interferometric modulator elements 525 comprise an optical stack 583 formed on the planarization material 582, wherein the optical stack 583 comprises an electrode layer 580, a metal layer 578, such as chrome, and an dielectric or oxide layer 576. The electrode layer 580 comprises a conductive material, such as indium tin oxide (ITO), or zinc oxide (ZnO), for example, and may be substantially optically transmissive or partially transmissive. The metal layer 578 may comprise a material that is reflective such as chrome. Other metals may also be employed. In various embodiments, the electrode layer 580 has a thickness sufficient to be conductive and the metal layer 578 may have a thickness sufficient to be partially reflective. The electrode layer 580 and metal layer 578 may, for example, have thicknesses of about 100Å to about 1 μm, and the dielectric layer 576 may have a thickness of about 100 to 2,000Å. The dielectric layer may also comprise a multilayer dielectric optical film in some embodiments. Alternative configurations are also possible. For example, layers may be excluded and additional layers may be employed. Furthermore, the thicknesses may be outside the ranges in other embodiments.

As described above, the mechanical layer 570 supports a mirror 571 over the electrode, metal, and dielectric layers 580, 578, 576 to form the cavity 584. Other configurations are possible. In some embodiments, as discussed above, the mechanical layer 570 and the mirror 571 comprise one or more optically transmissive aperture regions configured to allow light to pass from the backlight source 575 therethrough and into a cavity of a corresponding interferometric modulator element. Also, the electrode 580 and/or the metal layers 578 may comprise a substantially transmissive material and/or may comprise a plurality of substantially transmissive apertures so as to allow transmission of light reflecting from one or more reflecting elements into a cavity of an interferometric modulator element. These features are discussed in more detail hereinafter.

Figure 9A:
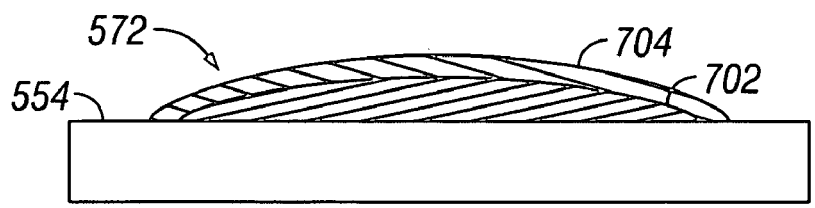
FIG. 9A is a cross-sectional view of one embodiment of a reflecting element comprising more than one material.

The reflecting elements 572 may be formed using a plurality of methods known in the technology, and a number of exemplary methods are discussed further hereinafter in reference to FIGS. 9A-9C, which illustrate a plurality of exemplary reflecting element structures and formations. In the embodiment illustrated in FIG. 9A, the reflecting element 572 comprises a shaped feature, e.g., a bump 702, formed of a base material such as a polymer. This shaped feature 702 is covered by an overlay layer 704 comprising reflecting material such as aluminum. The aluminum layer 704 may reflect light, for example, with a wavelength in the visible range. A reflective material other than aluminum may be used, such as, e.g., silver, titanium, gold, or copper. A layer of the base material may be deposited and patterned to form the bump 702 or other desired shape. A layer of reflective material 704 may be deposited on the polymer base material to form the reflective overlayer.

Figure 9B:
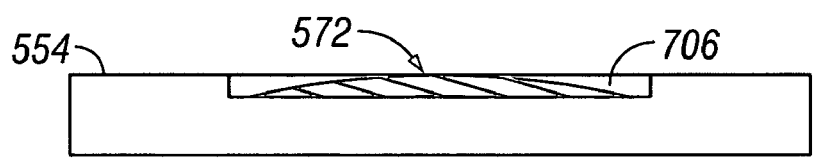
FIG. 9B is a cross-sectional view of an embodiment of a convex reflecting element formed in a cavity.

In the embodiment illustrated in FIG. 9B, the substrate 554 is etched so as to form a cavity 706 with a substantially rectangular cross-section. A reflecting element 572 is formed in the cavity 706 by depositing reflective material such as metal. A substantially convex geometry, for example, can be formed in the cavity 706. In one embodiment, the cavity has a substantially convex surface therein, and a substantially convex geometry is formed by depositing a reflective material over the convex surface in the cavity. Other geometries are possible.

Figure 9C:
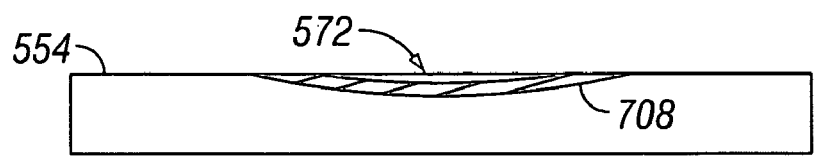
FIG. 9C is a cross-sectional view of an embodiment of a concave reflecting element formed in a cavity.

In the embodiment illustrated in FIG. 9C, a substantially concave cavity 708 is formed in the substrate 554 and a layer of reflecting material is deposited in the cavity 708 so as to form a substantially concave reflecting element 572. Alternatively, concave or convex surface features may be formed on the substrate that are not in a cavity, for example, by etching the substrate and the reflecting material may be deposited on this shaped surface feature. As noted above, the reflecting element structures, geometries, as well as position illustrated and discussed herein are exemplary in nature and other structures, geometries, and positions are not to be excluded. Exemplary methods of forming a reflecting element as described above may comprise deposition of a material, etching, thermal annealing, radiated curing and combinations thereof.

As discussed in reference to FIG. 8B, the reflecting elements 572 may be covered by planarization material, which has a thickness of about 1 μm, for example. The planarization material may be applied using a method such as spin-on deposition. Several spin-on deposition materials are available that are optically transmissive. Many of these materials can be "cooked" to form a silicon oxide material which is transparent. Such spin-on deposition materials are available from Dow Corning, Inc. of Midland, Mich. and Clariant Life Sciences K.K. of Tokyo, Japan. The planarization material could also be a material such as photoresist. Once the planarization material is formed, a planarization process, such as chemical mechanical polishing (CMP), could be used to planarize the surface of the planarization material. Alternately, materials other than planarization material can be employed and multiple layers can also be used.

Figure 10:
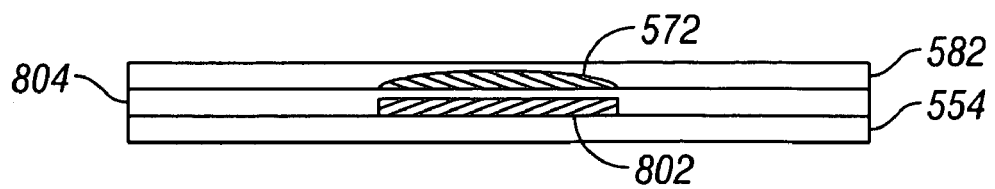
FIG. 10 is a cross-sectional view of a reflecting element and a mask configured to conceal the reflecting element from a viewer.

FIG. 10 illustrates one embodiment of a reflective element 572 for an interferometric modulator array wherein a concealing feature or mask is used to hide the reflecting element 572 from view. In one embodiment, a mask 802 is formed over the glass substrate 554 and covered by a substantially transparent layer 804. The reflecting element 572 is then formed over the transparent mask 802. Preferably, the mask 802 comprises a material configured to conceal the visible presence of the reflecting element 572. This mask 802 may be opaque or semi-transparent. The mask 802 may comprise an absorbing material, a reflective material, a transmissive material, or a combination thereof, and may comprise materials such as chromium (Cr), molybdenum (Mo), carbon black, dyes, etc. In certain embodiments, for example, the mask 802 may comprise photoresist materials (e.g., spin-on resist), polyimides, photoamids, inorganic polymers, and/or polymer materials which are either inherently substantially optically absorptive or reflective or which have a material, such as carbon particles (e.g., carbon black), metal particles, fillers and/or dyes, incorporated therein such that the mask 802 is substantially optically absorptive or reflective in the visible light spectrum. In certain embodiments, the material(s) are selected and incorporated into the mask 892 in amounts effective to provide the resulting substantially optically absorptive support structure with a black appearance. Variations in the design are possible.

In one embodiment, the mask 802 comprises an etalon or portion of an etalon. Specifically, one embodiment of the mask 802 comprises a first partially reflective/partially transmissive layer, such as a metal layer comprising, e.g., chromium, and at least one layer of cavity or spacing material, such as an oxide or planarization material, so as to form an etalon comprising the first reflective (e.g., metal) layer and the reflecting element 572. In another embodiment, the mask 802 further comprises a second reflective layer between the spacing material and the reflecting element 572, wherein an etalon is formed by the first and second reflective layers below the reflecting element 572. The first and/or second etalon reflective layers may comprise the same material as the metal layer 578 in the optical stack 583. In certain embodiments, the etalon results in a predetermined color at the visible or viewing side of the interferometric modulator array and masks features which are undesirable for viewing.

As described above, the interferometric modulator array 500 can be efficiently illuminated using backlighting. In some embodiments, the light is collimated so that the light coming off the backlight source 575 has a limited range of angles. Preferably, the light is directed straight between the backlight source 575 and the array 500. The range of acceptable angles may depend on the combination of the structural dimensions. For example, if the aperture width (w) is 10 μm, the width of the reflecting element is 30 μm, and the distance between the mirrors 571 and the reflecting elements 572 is 1 μm, then steep angles (large angles with respect to the normal to the substrate) of light will be blocked, and other light will be reflected. The light can be collimated in several manners, depending on the selection of backlight. For example some backlight structures can be provided that limit the emitted light within a certain range of angles. Lenses or other collimating optics may be employed. The backlight 575 can also use a filter or other optical film to eliminate light at extreme angles.

The reflecting element 572 will spread the collimated light from the backlight 575 to neighboring interferometric modulators. Because the light will reflect at a large variety of angles from the reflecting element, light will be provided to several interferometric modulators from a single reflecting element. Light for a single interferometric modulator can also come from a plurality of reflecting elements. It is not necessary, however, that the light provided by the backlight comprise collimated light.

Figure 11:
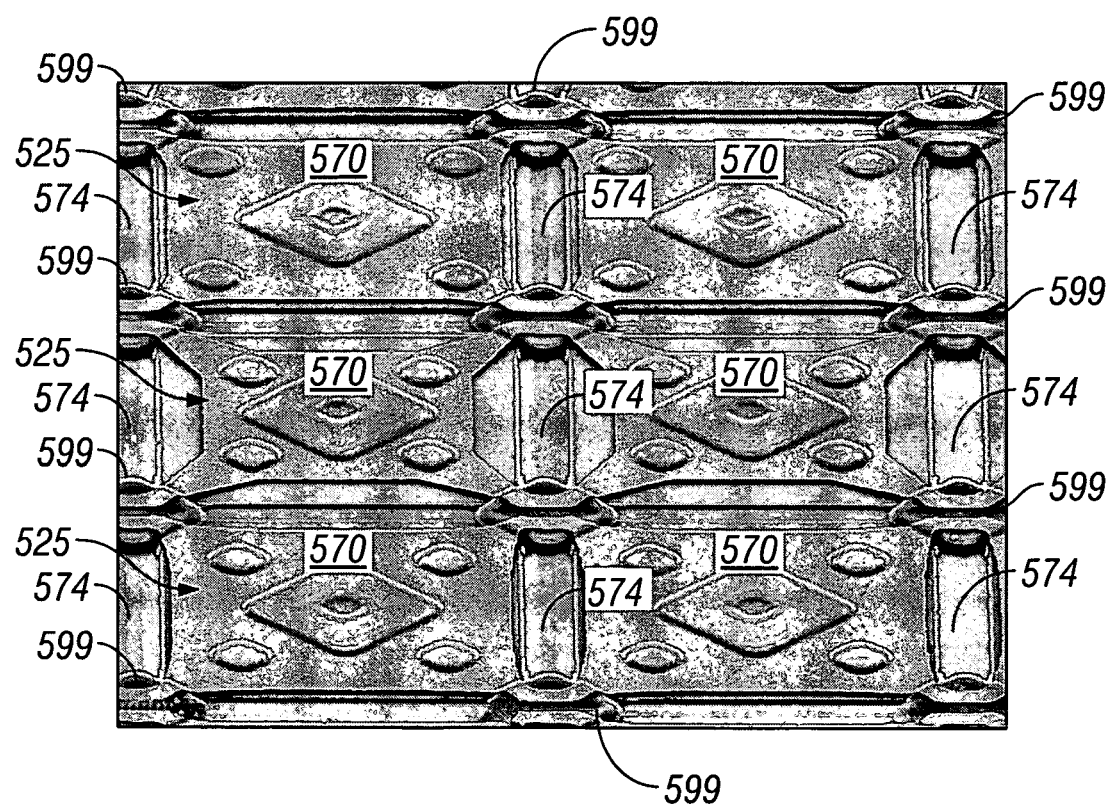
FIG. 11 is a plan view of an interferometric modulator array showing an upper electrode layer patterned to form a plurality of optical aperture regions for transmission of light therethrough.

An SEM image of another embodiment of the interferometric modulator array is shown in FIG. 11. In this interferometric modulator array 500, the mechanical layer 570 is patterned to form a plurality of aperture regions 574 surrounding each interferometric modulator element 525. Narrow portions of the electrode layer 570 at corners of the modulator elements 525 provide electrical connection between the interferometric modulators, e.g., along a row. These narrow portions of the electrode layer 570 are disposed proximal to post structures 599 shown in FIG. 11. The plurality of optically transmissive aperture regions 574 enable light to be propagated to the reflecting element (not shown) such as describe above.

Although spatial light modulators comprising arrays of interferometric modulator elements have been described above, in other embodiments, other types of light-modulating elements that form the light-modulating arrays may be employed. For example, other types of MEMS structures may be employed in other embodiments. Other types of structure not based on MEMS technology may also be used in certain embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method of manufacturing a spatial light modulator, comprising:
   forming at least one reflecting element on a substrate; and
   forming a plurality of light-modulating elements above the substrate and above the at least one reflecting element so as to form a light-modulating array, the light modulating array having at least one optically transmissive aperture region, each light modulating element comprising first and second optical surfaces that define a cavity, said second optical surface movable with respect to the first optical surface, wherein the at least one reflecting element is configured to receive light through the at least one aperture region and reflect at least a portion of the received light into said cavity.

2. The method of claim 1, wherein forming the at least one reflecting element comprises depositing at least one of aluminum, silver, titanium, gold, and copper.

3. The method of claim 1, wherein said at least one reflecting element is formed on a layer of material formed on said substrate.

4. The method of claim 1, further comprising forming a concealing feature on the substrate aligned with the at least one reflecting element so as to conceal the visible presence of the at least one reflecting element.

5. The method of claim 4, wherein the concealing feature comprises a mask of at least one of absorbing material and a reflective material.

6. The method of claim 4, wherein the concealing feature comprises a mask layer of at least one of carbon black material, a dye, chromium, and molybdenum.

7. The method of claim 4, wherein the concealing feature comprises a metal film so as to form an etalon comprising the metal film and the at least one reflecting element.

8. The method of claim 7, wherein the etalon has a thickness that causes the etalon to reflect a color.

9. The method of claim 1, wherein forming the at least one reflecting element comprises forming a shaped base structure on the substrate, and depositing a reflecting material on the shaped base structure.

10. The method of claim 1, further comprising forming a cavity in the substrate, and forming the at least one reflecting element substantially in the cavity of the substrate.

11. The method of claim 1, wherein forming the at least one reflecting element comprises depositing a layer of reflecting material on the substrate and surface treating said layer.

12. The method of claim 1, wherein forming the at least one reflecting element comprises depositing a composite material on the substrate surface, wherein the composite material comprises reflective particles suspended in a substantially transparent material.

13. The method of claim 12, wherein the composite material is deposited at discrete locations on the substrate surface so as to form a plurality of reflecting elements.

14. The method of claim 1, wherein the spatial light modulator comprises a microelectromechanical system (MEMS).

15. The method of claim 1, wherein the spatial light modulator comprises a reflective spatial light modulator.

16. The method of claim 1, wherein the plurality of light-modulating elements comprises a plurality of interferometric modulators.

* * * * *

UNITED STATES PATENT AND TRADEMARK OFFICE
CERTIFICATE OF CORRECTION

| | | |
|---|---|---|
| PATENT NO. | : 7,349,139 B2 | Page 1 of 1 |
| APPLICATION NO. | : 11/417431 | |
| DATED | : March 25, 2008 | |
| INVENTOR(S) | : Clarence Chui and Ming-Hau Tung | |

It is certified that error appears in the above-identified patent and that said Letters Patent is hereby corrected as shown below:

Title Page; item (56);
At page 5, column 1 (Other Publications), line 15, delete "Quanum" and insert
-- Quantum --, therefor.

At page 5, column 1 (Other Publications), line 15, delete "Feb." and insert -- Feb., --, therefor.

At page 5, column 2 (Other Publications), line 53, delete "5." and insert -- 5, --, therefor.

At page 6, column 2 (Other Publications), line 4, after "11/417,808" insert -- , --.

At column 10, lines 35-36, delete "1582 m," and insert 15 μm, --, therefor.

At column 11, line 1, delete "waveguide.to" and insert -- waveguide to --, therefor.

At column 13, line 24, delete "beyond." and insert -- beyond --, therefor.

Signed and Sealed this

Twenty-fifth Day of August, 2009

David J. Kappos
*Director of the United States Patent and Trademark Office*